(12) United States Patent
Lim

(10) Patent No.: US 7,075,543 B2
(45) Date of Patent: Jul. 11, 2006

(54) GRAPHICS CONTROLLER PROVIDING FLEXIBLE ACCESS TO A GRAPHICS DISPLAY DEVICE BY A HOST

(75) Inventor: Ricardo Te Lim, Richmond (CA)

(73) Assignee: Seiko Epson Corporation, Tokyo (JP)

( * ) Notice: Subject to any disclaimer, the term of this patent is extended or adjusted under 35 U.S.C. 154(b) by 245 days.

(21) Appl. No.: 10/615,559

(22) Filed: Jul. 8, 2003

(65) Prior Publication Data

US 2005/0007373 A1    Jan. 13, 2005

(51) Int. Cl.
*G06F 15/76* (2006.01)
*G09G 3/30* (2006.01)

(52) U.S. Cl. .................................. 345/519; 345/87
(58) Field of Classification Search ........ 345/501–503, 345/1.1–3.1, 103, 87, 48
See application file for complete search history.

(56) References Cited

U.S. PATENT DOCUMENTS

| | | | | |
|---|---|---|---|---|
| 5,423,009 A | * | 6/1995 | Zhu ........................... | 710/307 |
| 5,479,183 A | * | 12/1995 | Fujimoto .................... | 345/3.1 |
| 5,949,437 A | * | 9/1999 | Clark ......................... | 345/502 |
| 6,327,002 B1 | * | 12/2001 | Rinaldi et al. .............. | 345/603 |
| 6,618,026 B1 | * | 9/2003 | Grigor et al. ............... | 345/1.1 |
| 2001/0011965 A1 | * | 8/2001 | Wilks ......................... | 345/1.1 |
| 2003/0001970 A1 | * | 1/2003 | Zeidler et al. ............. | 348/569 |
| 2003/0076278 A1 | * | 4/2003 | Choi ........................... | 345/1.1 |

* cited by examiner

*Primary Examiner*—Kee M. Tung
(74) *Attorney, Agent, or Firm*—Mark P. Watson

(57) ABSTRACT

A graphics controller providing flexible access to a graphics display device by a host. The controller includes an input bus for coupling to an output bus of the host, an output bus for coupling to the input bus of the graphics display device, a video processing circuit having an input coupled to the input bus of the graphics controller and an output coupled to the output bus of the graphics controller, and a bypass switching circuit adapted to switchably couple the input bus of the graphics controller to the output bus of the graphics controller so as to bypass the video processing circuit.

20 Claims, 1 Drawing Sheet

GRAPHICS CONTROLLER PROVIDING FLEXIBLE ACCESS TO A GRAPHICS DISPLAY DEVICE BY A HOST

FIELD OF THE INVENTION

The present invention relates to a graphics controller providing flexible access to a graphics display device by a host.

BACKGROUND OF THE INVENTION

In a graphics display device, such as an LCD (Liquid Crystal Display) panel, data for display as well as instructions for displaying the data are provided by a host. In principle, any host can interface directly with a display device provided that the host's read/write operations conform to the protocol specified for the display device. However, it is often desirable to provide an application specific graphics controller as a separate chip, such as an LCD controller, between the host and the display device to provide specialized functions. For example, an LCD controller chip might be used to automate the transfer of images from a camera to an LCD panel, or to allow a host having a parallel bus to interface with an LCD panel having a serial interface and vice versa.

A specific example of such an LCD controller is used in a cellular telephone. The telephone includes a microprocessor functioning as a host CPU, a camera, and may include three LCD panels which, for purposes herein, may be considered elements of a single graphics display device. The LCD controller provides a camera interface for receiving video data from the camera, converting the video data into a displayable form, and transmitting the data. The LCD controller is also provided with a JPEG encoder/decoder ("CODEC") for encoding outgoing video data for transmission and decoding incoming video data for display. The LCD controller further provides other functions, such as cropping or otherwise resizing the image to eliminate selected data, and translating the data from one color space to another. In telephone and other systems used for data communications, such controllers are used for both wireless and wired communications.

In the example given above, the host generally also provides video data to the LCD panels for display, and the host issues commands to the LCD panels, to enable the selected LCD panel(s), and to specify display parameters, such as image size and color resolution. The host may also read data from the LCD panels. For example, the host may read status bits in the LCD panels, or may read images taken by the camera from the LCD panels, e.g., to resize the images.

Where an application specific graphics controller is provided, the host communicates through the controller rather than directly with the graphical display device. Data would otherwise move between the host and the graphics display device without the processing provided by the graphics controller. Accordingly, the graphics controller is provided with the capability to receive data written to the graphics controller by the host in a memory, and to read out from the memory the data received from the host to the graphics display device. However, it is recognized herein that the controller nevertheless adds delay in such transmissions. Accordingly, there is a need for a graphics controller providing flexible access to a graphics display device by a host that minimizes or eliminates this delay.

SUMMARY OF THE INVENTION

According to the invention, a graphics controller providing flexible access to a graphics display device by a host is provided that includes an input bus for coupling to an output bus of the host, an output bus for coupling to the graphics display device, a video processing circuit having an input coupled to the input bus of the graphics controller and an output coupled to the output bus of the graphics controller, and a bypass switching circuit adapted to switchably couple the input bus of the graphics controller to the output bus of the graphics controller so as to bypass the video processing circuit.

Therefore, it is an object of the present invention to provide a novel graphics controller providing flexible access to a graphics display device by a host.

It is another object of the present invention to provide such a graphics controller that minimizes or eliminates delays in transmissions between a host and the graphics display device communicating through the graphics controller.

These and other objects, features and advantages of the present invention will be more readily understood upon consideration of the following detailed description of the invention, taken in conjunction with the following drawings.

BRIEF DESCRIPTION OF THE DRAWINGS

The FIGURE is a block diagram of a graphics controller providing flexible access to a graphics display device by a host according to the present invention.

DETAILED DESCRIPTION OF A PREFERRED EMBODIMENT

Figure 1:
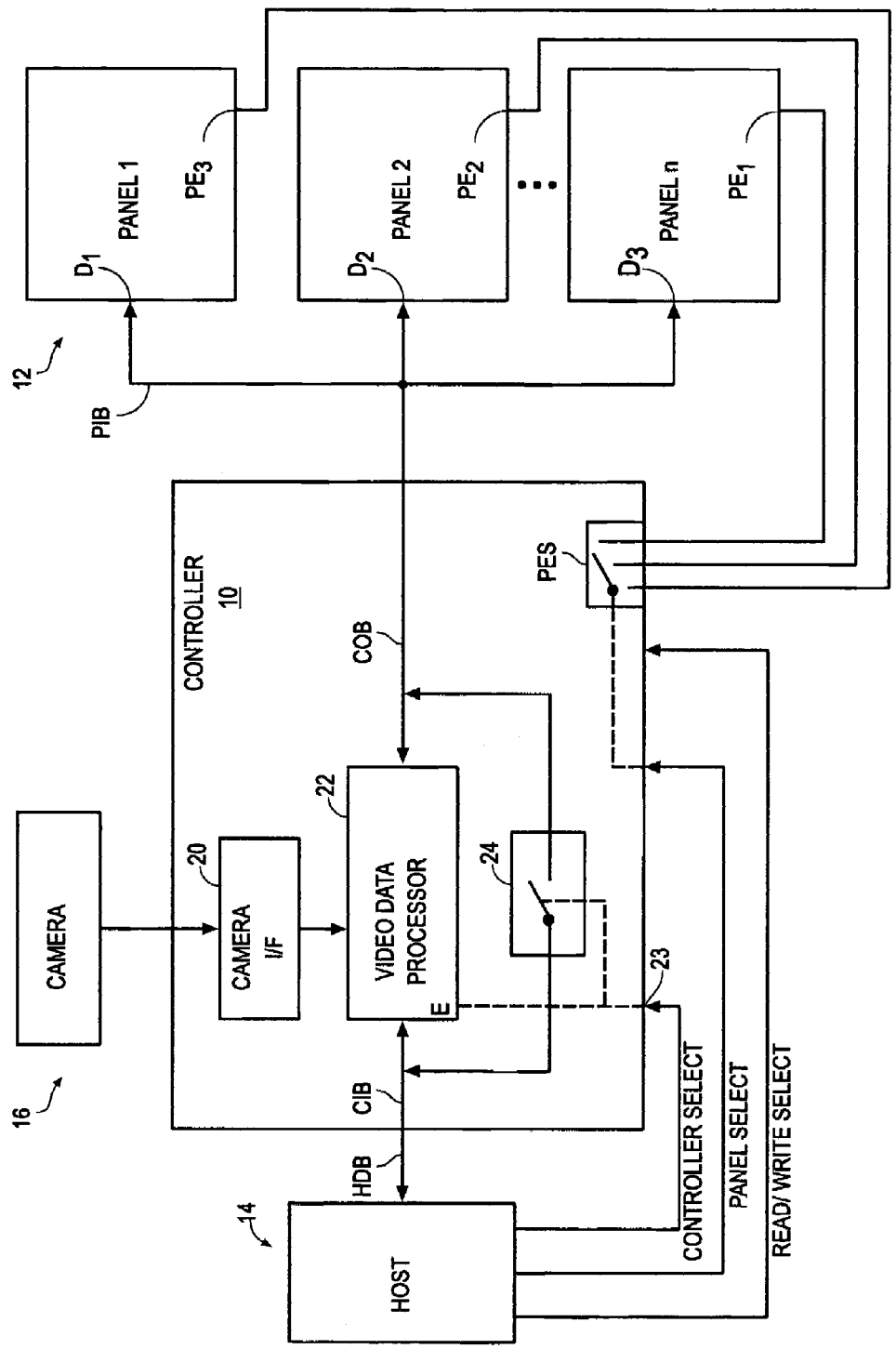

Referring to the FIGURE, a graphics controller 10 is shown for providing flexible access to a graphics display device 12 by a host 14 according to the present invention. These three components form a display system or subsystem that may be used in any desired apparatus. A preferred context for the invention is a cell phone or wireless Internet access device.

A host data bus HDB, which may be serial or parallel, is coupled to a corresponding controller input bus CIB in the graphics controller 10. A panel input bus PIB, which may be serial or parallel, is coupled to a corresponding output bus COB in the graphics controller. Generally, graphics controllers provide both a parallel to serial converter and a serial to parallel converter to permit either a parallel or serial host data bus HDB to interface with either a parallel or serial panel input bus PIB. However, the graphics controller 10 need not include such converters, since it is preferably used in graphics systems wherein the type of interface is the same for both the host and the panels.

An exemplary graphics display device 12 includes one or more LCD panels $PANEL_N$ where N=3 in this example; however, any other graphics display device or devices could be substituted, such as one or more CRTs (cathode-ray-tubes) or printers, without departing from the principles of the invention.

The LCD panels include data inputs $D_1$–$D_N$, and panel enable inputs $PE_1$–$PE_N$. The data inputs D are coupled to the panel input bus PIB. The graphics controller 10 includes a panel enable switch PES that enables a selected one of the panels $PANEL_N$ to be responsive to data on the panel input bus PIB. The panel enable switch receives control instructions from the host 14 over the line indicated as PANEL SELECT.

The panels typically include panel registers (not shown) which receive selected command or data formatting instructions via an indirect addressing protocol. Particularly, data is first transmitted to the graphics display device 12 that specifies the address of one of these panel registers in the graphics display device, and the next data transmitted to the graphics display device is stored in the panel register.

The graphics controller 10 provides a particular advantage when used with a camera 16. Data from the camera is not formatted so that it can be displayed on the graphics display device 12 without further processing. Rather than provide the output of the camera to the host so that the host must process the camera data for display, the graphics controller 10 includes a camera interface 20 to off-load this processing from the host. In addition, the camera data is often transmitted to another phone, or over the Internet as an email attachment, and is preferably compressed to limit bandwidth. Similarly, compressed data from similar cameras received wirelessly and/or over the Internet must be decompressed to permit display. Accordingly, the graphics controller 10 provides a video data processor 22 that includes a CODEC (not shown) for data compression/decompression. Preferably, the CODEC implements a JPEG protocol, but any desired compression/decompression protocol can be supported.

The data processor 22 may also provide other functions, such as cropping or resizing the image by eliminating data, and converting data from one color space to another. "Processing" such as performed by the video data processor 22 according to the invention may include performing any operation on data over and above simply transmitting the data on a bus through the graphics controller.

According to the invention, the graphics controller 10 provides a controller select input 23 for communication with a CONTROLLER SELECT line extending from the host. The CONTROLLER SELECT LINE is asserted (or de-asserted) by the host to enable a "processing bypass" mode of the controller 10 and de-asserted (or asserted) to enable normal processing of data on the controller input bus CIB by the video data processor 22. Particularly, the controller select input 23 is coupled to an enable input E of the video data processor and a bypass switch 24. The controller 10 provides that where the video data processor 22 is enabled, the bypass switch is open and vice versa. Particularly, the host's control of the CONTROLLER SELECT line coupled to the controller select input 23 of the controller 10 determines whether data from the controller input bus CIB is passed through the video data processor 22 for processing and thence to the controller output bus COB, or is otherwise routed directly to the controller output bus COB so as to bypass the video data processor. The host 14 may communicate directly with the graphics display device 12 where that would be advantageous, or the host may employ the graphics controller 10 for video or other processing where that would be advantageous, providing outstanding flexibility.

An outstanding advantage of the present invention is that it permits avoiding storing and processing data in the graphics controller chip where that is desired, including avoiding the necessity to synchronize the movement of data through the graphics controller chip, to increase system efficiency while maintaining all of the advantages of application specific controllers. It is to be recognized that, while a particular graphics controller providing for flexible access to a graphics display device by a host has been shown and described as preferred, other configurations and methods could be utilized, in addition to those already mentioned, without departing from the principles of the invention.

The terms and expressions which have been employed in the foregoing specification are used therein as terms of description and not of limitation, and there is no intention in the use of such terms and expressions to exclude equivalents of the features shown and described or portions thereof, it being recognized that the scope of the invention is defined and limited only by the claims which follow.

The invention claimed is:

1. A graphics controller chip for providing an interface between a graphics display device and a host, and for permitting the host to communicate directly with the graphics display device, comprising:
   an input bus for coupling to an output bus of the host;
   an output bus for coupling to the graphics display device;
   an on-chip video processing circuit having an input coupled to the input bus of the graphics controller and an output coupled to the output bus of the graphics controller; and
   a bypass switching circuit in the chip adapted to electrically couple and decouple the input bus of the graphics controller to the output bus of the graphics controller so that when coupled the host may communicate directly with the graphics display device thereby bypassing the video processing circuit.

2. The graphics controller of claim 1, further comprising a camera interface for interfacing a camera to the video processing circuit.

3. The graphics controller of claim 1, wherein the graphics display device includes one or more LCD panels.

4. The graphics controller of claim 3, wherein the graphics display device includes a plurality of LCD panels, and wherein the graphics controller includes a panel select switch for selecting one of the panels to receive data from the output bus of the graphics controller.

5. The graphics controller of claim 4, further comprising a camera interface for interfacing a camera to the video processing circuit.

6. The graphics controller of claim 1, further comprising a select input for receiving a signal for opening and closing the bypass switching circuit.

7. A method providing for flexible access to a graphics display device by a host, the method comprising the steps of:
   providing a chip for providing an interface between the graphics display device and a host, and for permitting the host to communicate directly with the graphics display device, the chip including:
      an input bus coupled to an output bus of the host;
      an output bus coupled to the graphics display device;
      an on-chip video processing circuit having an input coupled to the input bus of the graphics controller and an output coupled to the output bus of the graphics controller; and
      a bypass switching circuit in the chip for electrically coupling the input bus of the graphics controller to the output bus of the graphics controller so that when the chip is in a processing bypass mode the host may communicate directly with the graphics display device thereby bypassing the video processing circuit; and
   enabling the processing bypass mode of the chip.

8. The method of claim 7, wherein the step of enabling the processing bypass mode is directed by the host.

9. The method of claim 7, further comprising obtaining video data from a video camera and providing the video data to the video processing circuit.

10. The method of claim 7, further comprising providing one or more LCD panels in the graphics display device.

11. The method of claim 10, wherein more than one LCD panel is provided in the graphics display device, the method further comprising selecting one of the panels to receive data from the output bus of the graphics controller.

12. The method of claim 11, further comprising obtaining video data from a video camera and providing the video data to the video processing circuit.

13. The method of claim 7, wherein the access by the host comprises writing data to the graphics display device.

14. The method of claim 7, wherein the access by the host comprises reading data from the graphics display device.

15. The method of claim 7, wherein the video processing circuit performs a processing operation selected from the group consisting of
   an image cropping operation;
   an image resizing operation;
   a color space conversion operation;
   an image data compression operation; and
   an image data de-compression operation.

16. A graphics display system, comprising:
   a host;
   at least one graphics display device; and
   a graphics controller chip for providing an interface between the graphics display device and the host, and for permitting the host to communicate directly with the graphics display device the graphics controller chip including:
   an input bus directly coupled to an output bus of the host;
   an output bus directly coupled to the graphics display device;
   an on-chip video processing circuit having an input coupled to the input bus of the graphics controller and an output coupled to the output bus of the graphics controller; and
   a bypass switching circuit in the chip adapted for electrically coupling the input bus of the graphics controller to the output bus of the graphics controller so that when coupled the host may communicate directly with the graphics display device thereby bypassing the video processing circuit.

17. The graphics display system of claim 16, the graphics controller further comprising a select input for receiving a signal for opening and closing the bypass switching circuit.

18. The graphics display system of claim 16, further comprising a camera, and the graphics controller further comprising a camera interface for interfacing the camera to the video processing circuit.

19. The graphics display system of claim 16, wherein the graphics display device includes a plurality of LCD panels, and wherein the graphics controller includes a panel select switch for selecting one of the panels to receive data from the output bus of the graphics controller.

20. The graphics display system of claim 19, further comprising a camera interface for interfacing the camera to the video processing circuit.

* * * * *

UNITED STATES PATENT AND TRADEMARK OFFICE
CERTIFICATE OF CORRECTION

PATENT NO. : 7,075,543 B2 Page 1 of 1
APPLICATION NO. : 10/615559
DATED : July 11, 2006
INVENTOR(S) : Ricardo Te Lim It is certified that error appears in the above-identified patent and that said Letters Patent is hereby corrected as shown below:

Claim 16, column 5, line 31, change "display device the" to --display device, the--

Signed and Sealed this

Twenty-eighth Day of November, 2006

JON W. DUDAS
*Director of the United States Patent and Trademark Office*